May 3, 1938. S. SMITH Re. 20,716

LAMINATED CONTAINER

Original Filed Feb. 27, 1933 2 Sheets-Sheet 1

Inventor
Swan Smith

By Crowell & Lagaard
Attorneys

May 3, 1938. S. SMITH Re. 20,716

LAMINATED CONTAINER

Original Filed Feb. 27, 1933 2 Sheets-Sheet 2

Inventor
Swan Smith

By Crowell & Lagaard
Attorneys

Reissued May 3, 1938

Re. 20,716

UNITED STATES PATENT OFFICE 20,716

LAMINATED CONTAINER

Swan Smith, White Bear, Minn., assignor, by direct and mesne assignments, of one-half to David C. Shepard, St. Paul, Minn., and one-half to Alfred R. Metzger, White Bear Lake, Minn.

Original No. 1,995,523, dated March 26, 1935, Serial No. 658,689, February 27, 1933. Application for reissue December 5, 1935, Serial No. 53,023

13 Claims. (Cl. 229—4.5)

My invention relates to laminated containers and has for its object to provide a container and a method of forming the same, whereby a conical container may be constructed without waste of material.

Another object of the invention resides in providing a container having a bottom formed with a flange extending downwardly therefrom and in further providing a wall structure built about said flange.

An object of the invention resides in providing a container in which the wall structure is formed from sheets of paper glued one upon the other and of a width greater than the height of the container.

A still further object of the invention resides in providing a container in which the sheets used in the construction of the wall structure are individually turned back at the lower marginal portion thereof and glued to the flange of the bottom and to one another.

An object of the invention resides in providing a laminated paper container constructed of sheets of paper formed to overlap at their ends and in further constructing the sheets so that the width of the overlap varies throughout the length of the container.

Another object of the invention resides in constructing the container conical and in utilizing sheets of uniform length to form the varying overlap.

A feature of the invention resides in utilizing sheets for the purpose in which the ends thereof are parallel to one another.

A still further object of the invention resides in utilizing sheets having the upper and lower edges thereof curved and of the same degree of curvature.

An object of the invention resides in utilizing a plurality of said sheets and in arranging them one upon the other and in further constructing said sheets with such a degree of curvature that the upper curved edges of the successive sheets placed one upon the other register with or lie in continuation of one another.

A still further object of the invention resides in employing a metal hoop disposed between the laminations of the wall structure of the container and in placing said hoop in proximity to the flange of the bottom.

An object of the invention resides in arranging said hoop so as to project upwardly above the upper surface of the bottom to reinforce the container at the juncture between the wall structure and bottom.

Another object of the invention resides in providing a method of constructing laminated paper containers which consists in wrapping sheets of paper one at a time about a mandrel against which a flanged bottom is held and in gluing the same to the flange of the bottom and to one another and which further consists in arranging the sheets so that the lower marginal portions thereof normally project outwardly beyond the ends of the flange and which further consist in individually turning said projecting marginal portions of the sheets back upon the inner surface of the flange as the sheets are applied and in gluing the same to said flange and to one another.

Other objects of the invention reside in the novel combination and arrangement of parts and in the details of construction hereinafter illustrated and/or described.

In the construction of conical laminated containers and particularly containers formed of paper, considerable waste has heretofore occurred due to the necessity of cutting the sheets from which the container is constructed in the form of a truncated segment of a circle. In addition, considerable difficulty has been encountered in properly securing the bottom to the wall structure and in forming a sufficiently rigid bottom structure to stand up under the conditions to which the container may be subjected. The present invention provides a container in which these disadvantages are entirely overcome and by means of which sheets may be cut without waste, the sheets being arranged to overlap and the overlap at the ends of the sheet and the marginal portion at the lower edges thereof being utilized in the formation of the container. These disadvantages are further eliminated by turning the sheets one at a time about the flange of the bottom so as to equalize the tension in all of the sheets and by further inserting a metal hoop between the various sheets forming the wall structure of the container, to stiffen and reinforce the same.

Figure 1:
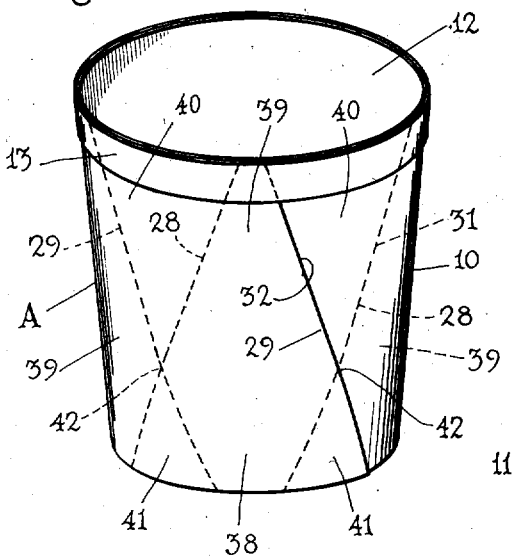
Fig. 1 is a perspective view of a container illustrating an embodiment of my invention.

My invention comprises a container illustrated at A in Fig. 1 which is particularly adapted for use in shipping butter and similar commodities. This container comprises a wall structure 10 having a bottom 11 secured thereto and open at its upper end as indicated at 12. A hoop 13 encircles the container at the upper end thereof. Any suitable cover may be used with the container and such construction forming no particular feature of this invention, has not been illustrated in this application.

Figure 3:
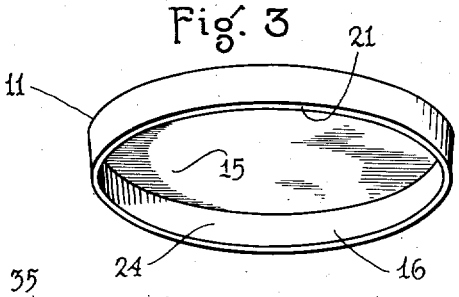
Fig. 3 is a perspective view of the bottom of the container detached therefrom and viewed from the underside thereof.
Figure 7:
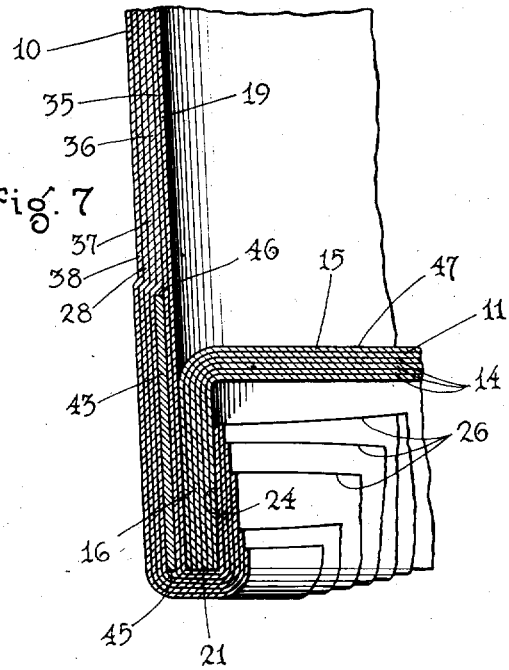
Fig. 7 is a sectional detail view taken on line 7—7 of Fig. 6 and drawn to an enlarged scale.

The bottom 11 may be constructed of paper or any other suitable material. When constructed of paper a number of sheets of paper which are indicated at 14 are employed which are circular in form and which are of a diameter somewhat greater than the diameter of the container at the lower end thereof. These sheets are glued one to the other and before the glue has set are placed in suitable dies and pressed to form a planiform portion 15 adapted to extend across the bottom of the container and a flange 16 depending from the planiform portion thereof as clearly shown in Figs. 3, 7 and 8 and adapted to lie against the inner surface of the container. This bottom is then dried either in the atmosphere or in an oven to cause the glue to set, or, if preferred, heat may be applied in the dies so that the bottom is caused to take the desired form when removed from the dies. If desired, the flange 16 may issue at right angles to the planiform portion 15 of the bottom 11 in which case the male die member is easily withdrawn from the bottom after the same has been formed. If, however, the flange 16 is desired to taper to conform to the surface of the container, the same may be accomplished by first constructing the flange to lie at right angles to the planiform portion by pressing the same in suitable dies and thereafter and before the glue is set, forcing the flange into a suitable conical hoop whereby the free edge of the flange is drawn together and in thereafter causing the glue to set and to give the flange a permanent form.

For building up the wall structure 10 of the container individual sheets of paper 19 are employed which are cut transversely from a roll of paper, the unrolled portion of which is indicated at 30. The sheets 19 are of a length equal to the width of the paper 30 and the ends 31 and 32 of these sheets which are formed through the lateral edges of the paper coming from the roll and are parallel to one another. The sheets 19 are severed from the roll by means of a cutter traveling in an arc of a circle. The arc of the circle is such that when the sheets are rolled upon a suitable mandrel, the upper edge 25 of the sheet forms a true circle at the open end of the container. The next adjacent sheet is severed from the roll by means of the same cutter traveling in the same arc thereby forming the lower edge 26 of the sheet with the same degree of curvature as the upper edge. Due to the fact that the container is in the shape of a frustrum of a cone a true circle at the lower end would be formed by a curved line 33 concentric with the circle of the edge 25. By means of this expedient an irregularity in the form of a crescent-shaped band 34 of material is left at the lower marginal portion 20 of the sheet which band is utilized in the formation of the container as will be presently described. Likewise the ends 28 and 29 of the sheet 19 are caused to overlap in the formation of the wall structure of the container, which overlap is utilized to stiffen and reinforce the container.

Figure 2:
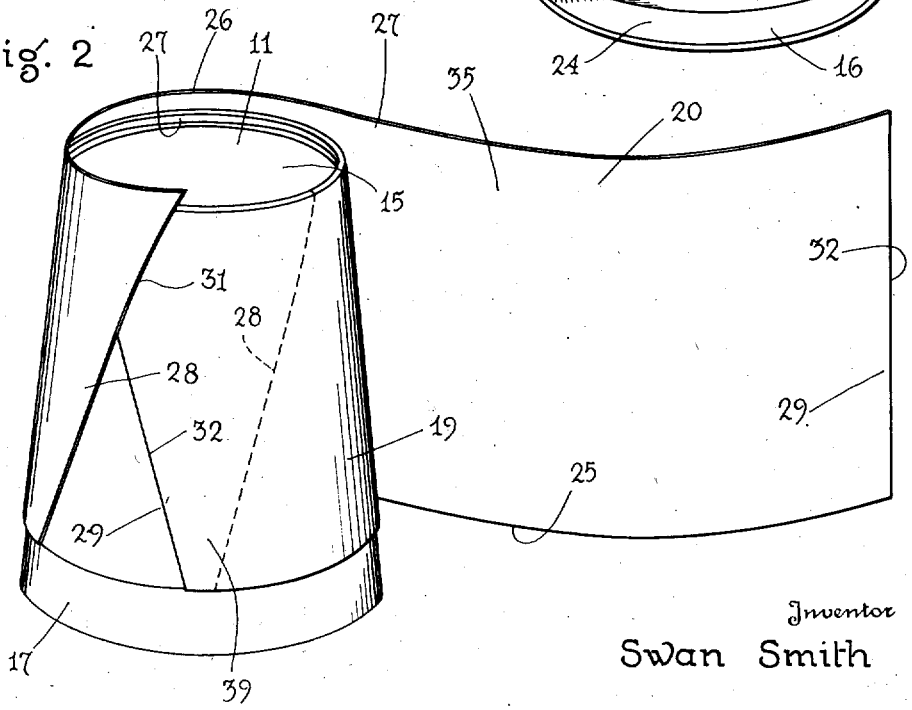
Fig. 2 is a perspective view illustrating the method of constructing the container and showing the container in inverted position.
Figure 8:
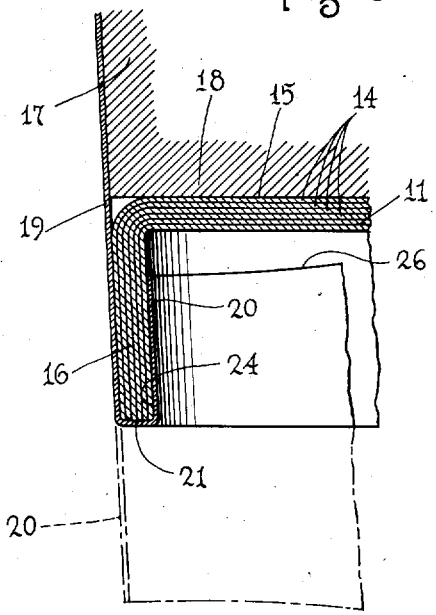
Fig. 8 is a view similar to Fig. 7 showing the manner of applying the individual sheets of the wall structure to the bottom.
Figure 6:
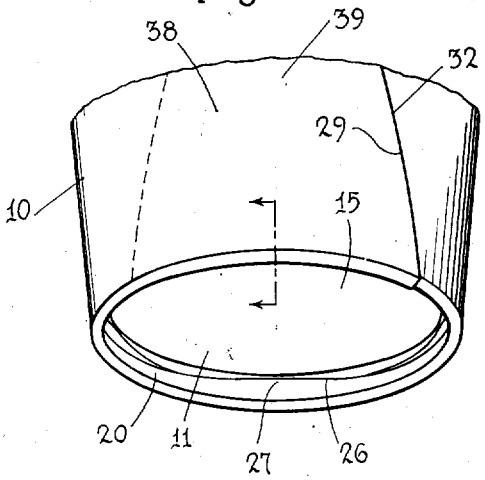
Fig. 6 is a perspective view of a portion of the finished container shown in Fig. 1 viewed from the underside thereof.
Figure 5:
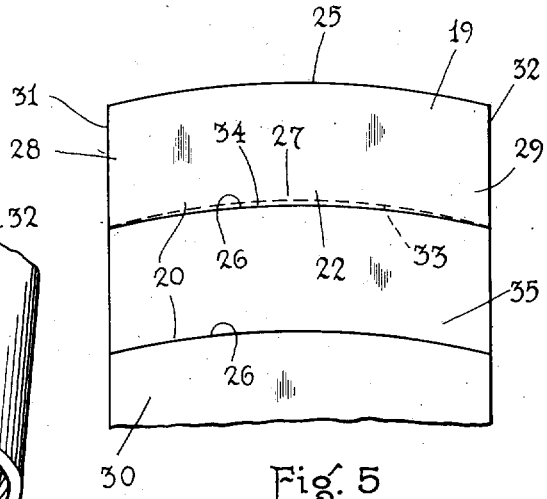
Fig. 5 is a developed view of the blanks from which the wall structure of the container is constructed illustrating the method of cutting the same from a roll of paper.

After the bottom is properly cured the wall structure is built upon the same in the following manner: A mandrel diagrammatically indicated at 17 in Figs. 2 and 8 is employed which is in the shape of a frustrum of a cone and which is of dimensions corresponding with the inner dimensions of the finished container. The flange 16 of the bottom 11 is of such shape and dimensions as to lie in continuation of the circumferential surface of the mandrel 17 when applied to the end thereof. In the construction of the wall structure the mandrel 17 is mounted upon a suitable support and the bottom 11 held against the end 18 thereof with the outer surface of the flange 16 lying in continuation of the said circumferential surface of said mandrel. Glue is then applied to both the inner and outer surfaces of the flange 16 of said bottom. A sheet of paper 19 cut as previously described is then wrapped about the mandrel with the lower marginal portion 20 thereof projecting outwardly below the free edge 21 of the flange 16 as shown in dotted lines in Fig. 8. Glue is then applied to the end of the sheet 19 first applied to the mandrel which is designated by the reference numeral 28 and the other end 29 of the sheet caused to overlap said last-named portion of the sheet and to form a joint extending longitudinally of the container and indicated in its entirety by the reference numeral 39. Due to the particular shape of the sheet, the overlap is somewhat in the shape of a trapezoid increasing in width throughout the length of the container and being of greatest width at the lower end thereof as clearly shown in Figs. 1 and 2. As the sheet is applied, the same adheres to the outer coated surface of the flange 16 of the bottom 11. After the sheet has been so applied and the ends thereof secured together, the marginal portion 20 of the sheet is turned inwardly about the free edge 21 of flange 16 and caused to adhere to the coated inner surface 24 of said flange. Due to the particular curvature of the upper edge 25 of the sheet 19, the same forms a true circle for the open upper end of the container. Since the lower edge of the sheet, which I have designated by the reference numeral 26, has the same curvature as the upper edge, the same will not form a true circle when turned inwardly upon the inner surface 24 of flange 16. Sheet 19 is, however, so arranged that the medial portion 27 of the sheet just clears the under surface of the planiform portion 15 of bottom 11. This causes the edge 26 to recede from said bottom as best shown in Figs. 2, 6, and 8, the marginal portion at the ends 28 and 29 of the sheet extending well inwardly of the lower edge 21 of the flange 16. The exact position of the crescent shaped band 34 of the sheet can best be determined by an inspection of Fig. 7 which illustrates the position of the corresponding part of the subsequent sheets.

After the first sheet 19 has been applied and glued to the flange 16 of bottom 11, other sheets 35, 36, 37 and 38 which are exactly of the same shape as the sheet 19 may be glued to the sheet 19 and to one another and applied in the same manner. The manner of applying the sheets to one another is illustrated in Fig. 2 in which the sheet 35 has been shown as partly wrapped about the mandrel and secured to the sheet 19. Where six sheets would ordinarily be used in the construction of a container to cause the desired strength with my invention the sheets may be made of sufficient length and only five sheets employed. Where five sheets are utilized the joint formed at the ends of each sheet would be disposed equidistant about the circumference of the container so that the overlap of the various sheets would be uniformly distributed throughout the circumference of the container and a container of uniform strength throughout would result. This would be accomplished by rotating the mandrel 17 through one-fifth of a revolution and applying the next sheet at exactly the same location with respect to the support for the mandrel as the first sheet. The mandrel would then be rotated another fifth of a revolution for each succeeding sheet until all of the sheets had been applied. As each sheet is applied the marginal portion 20 thereof at the lower edge of the sheet is turned back upon the corresponding marginal portion of the previously applied sheet so that all of the said marginal portions are glued together and to the flange 16 of the bottom. Due to the construction of the sheets as previously described, the medial portions 27 of the sheet become distributed about the inner surface 24 of flange 16, whereby the doubled back part of the wall structure is of uniform thickness about the circumference of the flange and gradually tapers off to a single thickness at the juncture of the flange 16 with the planiform portion 15 of the bottom 11. The particular manner in which the various sheets lie one upon the other within the flange 16 is best shown in Fig. 6.

Figure 4:
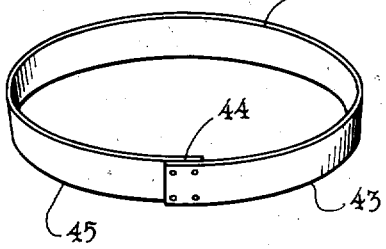
Fig. 4 is a perspective view of the hoop used with the container.

The joints 39 of the various sheets, as previously explained, are equally distributed about the circumference of the wall structure of the container. The exact relation of these joints of several of the sheets are shown in dotted lines in Fig. 1. At such localities, six thicknesses of material are present which give the container the desired strength at such localities. Intermediate the said joints at localities designated by the reference characters 40, only five thicknesses of paper exist. It will be noted, however, that the joints 39 themselves overlap at the lower end of the container as designated at 41 where sufficient thicknesses of paper exist. By selecting paper of desired length the overlap of the joints 41 can be made as great as desired. In the design of the container the elevation of the container where a strength equivalent to six sheets of paper is required is determined. The length of the sheets is then selected so that the apexes 42 formed between the edges 31 and 32 of juxtaposed sheets lie at such localities. The container is then of a minimum strength below such elevation equivalent to a container constructed of six sheets of paper and above such locality of a minimum strength of a container constructed of five sheets of paper. The joints 39 in addition to giving circumferential strength to the container form ribs extending lengthwise of the container which serve to stiffen the same and to lend longitudinal rigidity thereto. In this manner a much stiffer container can be formed than where the sheets of paper used in the construction of the body structure are cut exactly to shape and the surplus discarded.

Where the container is to receive rough handling a reinforcing hoop 43 shown in detail in Fig. 4 is employed which is imbedded within the interior of the wall structure 10. This hoop consists of a band of metal riveted, welded or otherwise secured together at its ends as designated at 44. This hoop is imbedded in between the layers of paper as the same are applied to the mandrel. Where five sheets are utilized, sheets 19 and 35 are first placed upon the mandrel and glued to the bottom 11 and to one another. Hoop 43 is then forced over the end of the bottom and upon the outer surface of the sheet 35 until the lower edge 45 of said hoop lies substantially flush with the lower edge 21 of the flange 16. The other sheets 36, 37 and 38 are then applied as previously described enveloping the said hoop and causing the same to become firmly imbedded within the interior of the wall structure proper. The hoop 43 is of such height that the upper end 46 thereof extends well above the upper surface 47 of the planiform portion 15 of bottom 11. This serves to reinforce the container at the juncture between the wall structure 10 and the bottom 11 preventing shearing of the wall structure at such bottom when the container containing butter or similar commodity is roughly handled and allowed to drop on the flange of the container. The hoop 46 further reinforces the flange and prevents breakage and injury to the same.

My invention is highly advantageous in that the containers may be constructed without waste of material. The portions of the sheet used in the formation of the body structure which would ordinarily be wasted are utilized to give both circumferential and longitudinal rigidity to the container and to reduce the total number of sheets of paper necessary. The container can be constructed in an extremely simple and expeditious manner, there being no waste to be handled and to be removed from the machine by means of which the container is built. By individually turning back the marginal portions of the container at the lower edge of the sheets used in the wall structure equal tension is placed upon each sheet and a much stronger and more substantial construction results. By the use of the hoop imbedded within the body structure of the container, rigidity is given to the flange thereof. At the same time shearing of the wall structure of the container at the juncture of the same at the bottom is entirely prevented.

Changes in the specific form of my invention, as herein disclosed, may be made within the scope of what is claimed without departing from the spirit of my invention.

Having described my invention, what I claim as new and desire to protect by Letters Patent is:

1. A conical container comprising a wall structure formed of sheets of paper glued one upon the other, said sheets being each of uniform length to provide an overlap at the ends of the sheet varying in width throughout the length of the container.

2. A conical container comprising a wall structure formed of sheets of paper glued one upon the other, said sheets having parallel edges to provide an overlap at the ends of the said sheets varying in width throughout the length of the container.

3. A conical container comprising a wall structure formed of sheets of paper glued one upon the other, said sheets being formed with curved upper and lower edges, both of the same curvature, the edges at one end of the container lying in alignment with one another, and the marginal portions of the sheets at the other end of the container being folded back and glued together.

4. A conical container comprising a wall structure formed of sheets of paper glued one upon the other, said sheets being formed with curved upper and lower edges, both of the same curvature, the curvature of the edges of the sheets at the upper end of the container being such as to cause said edges to lie in alignment and the marginal portions of the sheets at the other end of the container being folded back and glued together.

5. A conical container comprising a bottom having a flange issuing downwardly therefrom, a wall structure formed of sheets of paper glued one upon the other, said sheets being formed with curved upper and lower edges, both of the same curvature, the edges at the upper end of the container lying in alignment with one another and the marginal portions of the sheets of the lower end of the container extending outwardly beyond the flange of the bottom and being folded back upon said flange and glued together and to said flange.

6. A container comprising a bottom having a flange issuing downwardly therefrom, a wall structure comprising sheets of paper glued one upon the other, the lower marginal portions of said sheets being folded back and glued to said flange and to one another, and a metal hoop imbedded between said sheets of paper in proximity to the lower edge of said flange.

7. A container comprising a bottom having a flange issuing downwardly therefrom, a wall structure comprising sheets of paper glued one upon the other, the lower marginal portions of said sheets being folded back and glued to said flange and to one another, and a metal hoop imbedded between said sheets of paper in proximity to the lower edge of said flange, said hoop extending upwardly beyond the upper surface of said bottom, and reinforcing the container at the juncture between the bottom and wall structure.

8. A conical container having a wall structure constructed from a plurality of sheets of paper, each having straight parallel edges at the ends thereof, said sheets being glued one upon the other with their ends overlapping to form joints, the overlap being greater at the bottom of the wall structure than at the top, said joints being distributed circumferentially of said wall structure and each thereof in part overlying a part of the adjacent joint.

9. A container circular in cross-section having a wall structure constructed from a plurality of sheets of paper greater in number than three, said sheets being glued one upon the other with their ends overlapping to form joints, the overlap being greater at one end of the wall structure than at the other end, said joints being substantially uniformly distributed circumferentially of the container.

10. A container having a wall structure constructed from a plurality of sheets of paper, glued one upon the other with their ends overlapping to form joints, the overlap being greater at one end of the wall structure than at the other end, each of said joints in part overlying a part of the adjacent joint.

11. A conical container having a wall structure constructed from a plurality of sheets of paper, each formed with curved upper and lower edges, both of the same curvature, said sheets being glued one upon the other, the curvature of the edges of the sheets being such as to cause said edges at one end of the wall structure to register substantially with one another, said sheets being relatively disposed circumferentially of the container to distribute about the same the irregularities between the curved edges of the sheets at the other end of the container.

12. A paper container comprising inner and outer sheets of paper and a plurality of intermediate sheets of paper all glued together to form a wall structure for the container, said sheets all overlapping in like manner at their meeting edges, the amount of overlap of said sheets varying throughout the length of the container, the amount of overlap being greatest at the same end of the container, said sheets being arranged so that the joints of the adjacent intermediate sheets are disposed at different localities in the wall structure to make the container of substantially uniform thickness circumferentially and of a greater thickness where the overlap is the greatest.

13. A paper container comprising sheets of paper glued one upon the other to form a wall structure for the container, all of said sheets being constructed at their ends to form an overlapping joint at the ends of each sheet in the shape of a trapezoid with the base of the trapezoid at the bottom of the container, the joints of the sheets being disposed at different localities in the wall structure and being arranged to make the container of substantially uniform thickness circumferentially and of a greater thickness at the bases of the trapezoids.

SWAN SMITH.